United States Patent
Chen et al.

(10) Patent No.: US 10,354,317 B2
(45) Date of Patent: *Jul. 16, 2019

(54) INVENTORY MANAGEMENT

(71) Applicant: INTERNATIONAL BUSINESS MACHINES CORPORATION, Armonk, NY (US)

(72) Inventors: Jim C. Chen, Rochester, MN (US); Rafal P. Konik, Oronoco, MN (US); Ryan L. Rossiter, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/644,879

(22) Filed: Jul. 10, 2017

(65) Prior Publication Data
US 2019/0012723 A1    Jan. 10, 2019

(51) Int. Cl.
G06Q 30/00 (2012.01)
G06Q 30/06 (2012.01)
G06Q 30/02 (2012.01)
G06Q 10/08 (2012.01)

(52) U.S. Cl.
CPC ....... *G06Q 30/0639* (2013.01); *G06Q 10/087* (2013.01); *G06Q 30/0201* (2013.01); *G06Q 30/0631* (2013.01); *G06Q 30/0633* (2013.01)

(58) Field of Classification Search
CPC .......... G06Q 30/0639; G06Q 30/0201; G06Q 30/0631; G06Q 30/0633; G06Q 30/0643; G06Q 10/087
See application file for complete search history.

(56) References Cited

U.S. PATENT DOCUMENTS

| 7,580,699 B1* | 8/2009 | Shaw ................... G06Q 20/102 455/410 |
| 7,797,204 B2* | 9/2010 | Balent ................ G06Q 30/0633 705/26.8 |
| 8,516,396 B2 | 8/2013 | Bromenshenkel et al. |
| 9,324,106 B2 | 4/2016 | Argue et al. |
| 2002/0174021 A1 | 11/2002 | Chu et al. |
| 2005/0203790 A1 | 9/2005 | Cohen |
| 2008/0249838 A1 | 10/2008 | Angell et al. |

(Continued)

FOREIGN PATENT DOCUMENTS

WO    2014134060 A1    9/2014

OTHER PUBLICATIONS

Hou, J., & Chen, T. (2010). An RFID-Based Shopping Service System for Retailers. Advanced Engineering Informatics, 25, 103-115. (Year: 2010).*

(Continued)

*Primary Examiner* — William S Brockington, III
(74) *Attorney, Agent, or Firm* — Dmitry Paskalov

(57) ABSTRACT

A computer detects a user computing device when the user enters the store and receives the user's purchase history and preference information from a database. The computer receives a list and/or recipe that the user inputs into the application. This list and/or recipe is a list of items that the user plans to purchase. The computer identifies an item on the list, determines whether the item is in stock, and generates a route through the store so the user will reach each item on his list. The computer transmits the route to the user's computing device to be displayed.

7 Claims, 12 Drawing Sheets

(56) References Cited

U.S. PATENT DOCUMENTS

| | | |
|---|---|---|
| 2010/0070338 A1 | 3/2010 | Siotia et al. |
| 2010/0185487 A1 | 7/2010 | Borger et al. |
| 2013/0006807 A1 | 1/2013 | Bai et al. |
| 2013/0030915 A1 | 1/2013 | Statler et al. |
| 2013/0066740 A1 | 3/2013 | Ouimet et al. |
| 2013/0191246 A1* | 7/2013 | Calman .............. G06Q 30/0639 705/26.9 |
| 2014/0095285 A1 | 4/2014 | Wadell et al. |
| 2014/0156450 A1 | 6/2014 | Ruckart et al. |
| 2014/0207615 A1* | 7/2014 | Li ...................... G06Q 30/0623 705/26.61 |
| 2015/0012396 A1 | 1/2015 | Puerini et al. |
| 2015/0019391 A1 | 1/2015 | Kumar et al. |
| 2015/0149298 A1* | 5/2015 | Tapley ............... G06Q 30/0633 705/14.66 |
| 2015/0269649 A1* | 9/2015 | Shoemaker ........ G06Q 30/0633 705/26.8 |
| 2016/0258762 A1* | 9/2016 | Taylor ...................... E01H 5/12 |
| 2016/0275349 A1 | 9/2016 | Kempinski |
| 2017/0046771 A1* | 2/2017 | Cropp, Jr. .......... G06Q 30/0633 |

OTHER PUBLICATIONS

Mell et al., "The NIST Definition of Cloud Computing", Recommendations of the National Institute of Standards and Technology, Special Publication 800-145, Sep. 2011, 7 pages.

IBM: List of IBM Patents or Patent Applications Treated as Related (Appendix P), Dec. 28, 2017, pp. 1-2.

Pending U.S. Appl. No. 15/838,885, filed Dec. 12, 2017, entitled: "Intelligently Managing Store Inventory", pp. 1-52.

IBM: List of IBM Patents or Patent Applications Treated as Related (Appendix P), Apr. 9, 2018, pp. 1-2.

U.S. Pending U.S. Appl. No. 15/904,594, filed Feb. 26, 2018, entitled: "Intelligently Managing Store Inventory", pp. 1-50.

* cited by examiner

INVENTORY MANAGEMENT

BACKGROUND

The present invention relates generally to the field of user shopping and, more particularly to managing store inventory and user shopping experience.

The use of mobile device applications has increased in all facets of daily life, including shopping. The introduction of mobile shopping applications is changing old shopping paradigms and introduced new ones. For example, traditional orderly stocking regimens need not be adhered to when a user can be guided to the item in the store, rather than using a store layout in a set aisle fashion organized by item type. Stores can rely on mobile applications to communicate inventory information to users, much like online shopping. Additionally, stores use mobile applications to communicate information to a user that includes sale items, in-store promotions, and loyalty programs. The use of mobile applications by retail stores has increased due to the ease of use, convenience, and increased user loyalty that the applications bring.

BRIEF SUMMARY

Additional aspects and/or advantages will be set forth in part in the description which follows and, in part, will be apparent from the description, or may be learned by practice of the invention.

Embodiments of the present invention disclose a method, computer program item, and system for intelligently managing store inventory. A computer detects a user computing device when the user enters the store and receives the user's purchase history and preference information from a database. The computer receives a list and/or recipe that the user inputs into the application. This list and/or recipe is a list of items that the user plans to purchase. The computer identifies an item on the list, determines whether the item is in stock, and generates a route through the store so the user will reach each item on his list. The computer transmits the route to the user's computing device to be displayed.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

Figure 1A:
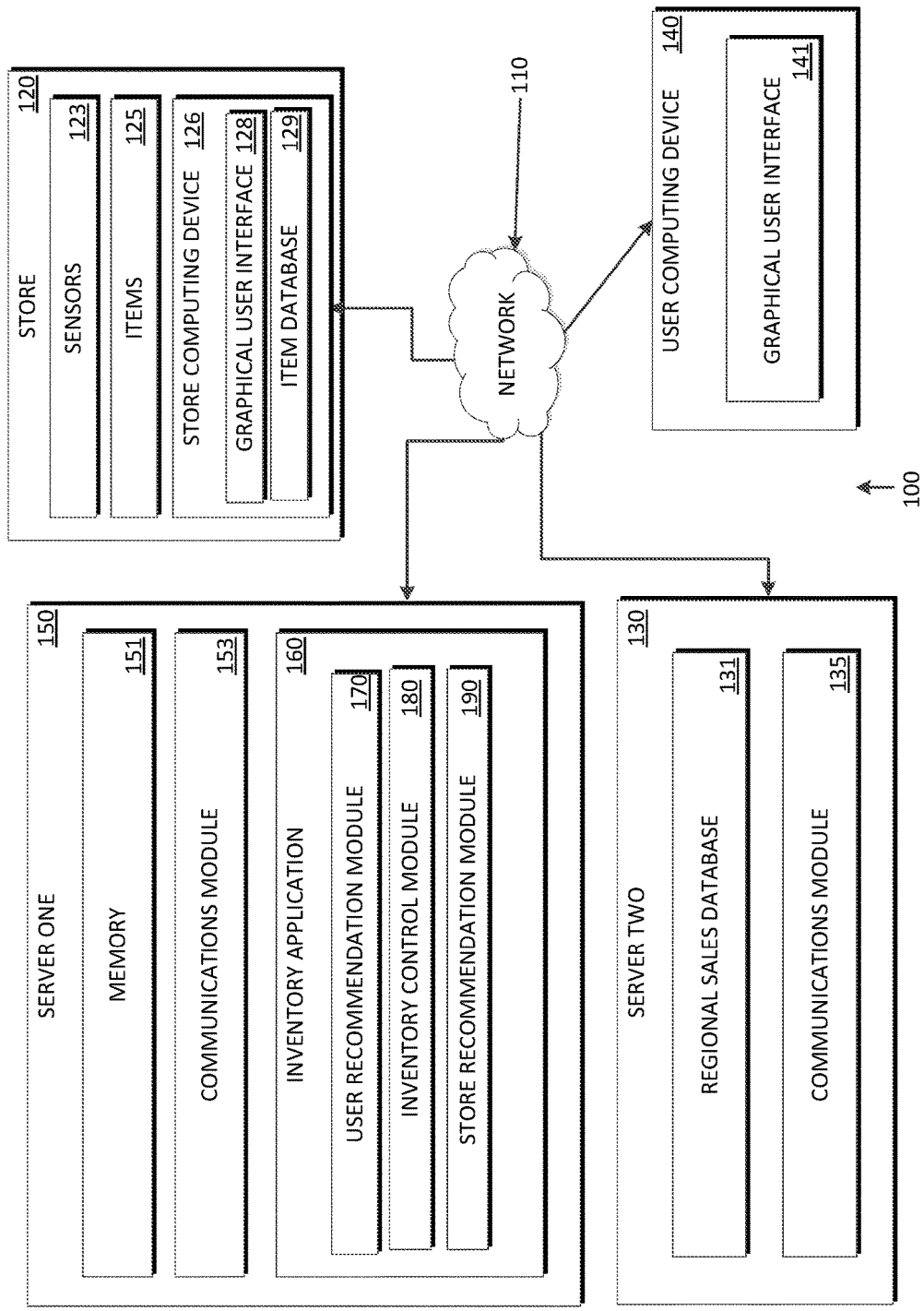
FIGS. 1A, 1B, 1C, 1D, and 1E are functional block diagrams illustrating a system for intelligently managing store inventory in accordance with an embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout.

Embodiments of the invention are generally directed to a system for intelligently managing store inventory using data collected from an application on a user computing device. Sales data and trends can be gathered and used to intelligently manage store inventory, drive item placement strategy within the store, recommend items to users, and providing item information. When a user enters the store, the user computing device connects to the inventory application via the network. The inventory application collects and analyzes sales and purchase data about, but not limited to, item/item sales, user purchase history, user item preferences (for example, specific brands, dietary restrictions, or a specific type of item), in-store traffic, item substitutions, and regional sales data from a regional sales database. The inventory application generates recommendations and transmits those to the user computing. The inventory application further generates recommendations for store layout and inventory ordering. For example, the inventory application can generate a store layout for product placement in which less popular items are placed next to best-sellers in order to boost the sales of the less popular item. Further, the inventory application can determine whether the sales of an item are slowing down and suggest a different order quantity or frequency.

Benefits of an intelligently stocked store include security, user health, user satisfaction, and business benefits. In an application-dependent store, the application can identify patterns of sales and user traffic and suggest inventory strategies to the merchant. These inventory layouts will be optimized for item placement. The application can additionally communicate with other local stores to analyze regional sales data trends, alert users to the restocking of high-demand items, and place new inventory orders. The application can combine user purchase history with user item preferences to recommend new items to a user, or even to suggest item substitutions when needed.

FIG. 1A is a functional block diagram illustrating a system for intelligently managing store inventory 100 using an application on a user computing device 140, in accordance with an embodiment of the present invention. The system for intelligently managing store inventory 100 includes a network 110, server one 150, server two 130, a user computing device 140, and a store 120 that includes a store computing device 126.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between the user computing device 140, the store computing device 126, the inventory application 160, and the communications module 135 on server two 130 and in accordance with one or more embodiments of the invention.

The user computing device 140, shown in FIG. 1A, represents a computing device that include a user interface, for example, a graphical user interface 141 (GUI). The graphical user interface 141 can be any type of application that can gain access to the network 110, transmit data to the inventory application 160 and receive data from the inventory application 160, for example, the application can be a web application, a graphical application, an editing application or any other type of application/program that allows a user to upload, change, delete, alter, or update data accessible to the inventory application 160.

The user computing device 140 may be any type of computing device that is capable of connecting to network 110, for example, a laptop computer, tablet computer, netbook computer, personal computer (PC), a desktop computer, a smart phone, a wearable computing device, or any programmable electronic device supporting the functionality required by one or more embodiments of the invention. The user computing device 140 may include internal and external hardware components, as described in further detail below with respect to FIG. 8. In other embodiments, server one 150 and server two 130 may operate in a cloud computing environment, as described in further detail below with respect to FIGS. 9 and 10.

The store 120, shown in FIG. 1A, includes a store computing device 126, sensors 123, and items 125. The items 125 are the items for sale. Each item 125 is equipped with some type of identification such as, but not limited to, a universal item code (UPC), a radio frequency identification tag (RFID), or some other identifying mark. When a new item 125 is shipped to the store, it is scanned (using UPC, RFID, or other identifying mark) by a store employee or by an automated process and logged in the inventory application 160.

The items 125 within the store 120 are tracked using sensors 123, which can be done in multiple ways. One way is that the user could scan each item 125 they pick up using a sensor 123 on his user computing device 140, for example a UPC scanner or RFID scanner when placing the item 125 in his basket. In the situation when the user no longer wants the item 125, the user could perform the same scan before they place the item 125 back on the shelf. Additionally, each shelving unit could be equipped with cameras, proximity scanners, RFID tag scanners, or some other type of sensor 123 that registers item 125 movement on or off a shelf. The sensor 123 that might be used on shelves could also be placed around the rim of a shopping cart to detect when items 125 enter or leave the user's cart. The sensors 123 used on the shelving can be the same or different as those used on shopping a cart. Finally, the items 125 could be tracked using cameras, proximity scanners, or some other type of sensor 123 placed strategically throughout the store to detect items 125 using his UPC, RFID, or other code, or even using feature recognition technology in the camera software.

The store computing device 126, shown in FIG. 1A, represents a computing device that include a user interface, for example, a graphical user interface 128 (GUI). The graphical user interface 128 can be any type of application that can gain access to the network 110, transmit data to inventory application 160 and receive data from the inventory application 160. The application could be a web application, a graphical application, an editing application or any other type of application/program that allows a user to upload, change, delete, alter, or update data accessible to inventory application. The store computing device 126 also includes an item database 129, where the item database 129 is a data store that stores inventory information about the current quantity of each item 125 within the store 120.

The store computing device 126 may be any type of computing device that is capable of connecting to network 110, for example, a laptop computer, tablet computer, netbook computer, personal computer (PC), a desktop computer, a smart phone, or any programmable electronic device supporting the functionality required by one or more embodiments of the invention. The store computing device 126 may include internal and external hardware components, as described in further detail below with respect to FIG. 8. In other embodiments, server one 150 and server two 130 may operate in a cloud computing environment, as described in further detail below with respect to FIGS. 9 and 10.

Server two 130, shown in FIG. 1A, includes a regional sales database 131 and a communications module 135. The communications module 135 is able to communicate with the user computing device 140, the inventory application 160, and the store computing device 126 via the network 110. Server two 130 may include internal and external hardware components, as depicted and described in further detail below with reference to FIG. 8. In other embodiments, server two 130 may include internal and external hardware components, as depicted and described in further detail below with respect to FIG. 9, and operate in a cloud computing environment, as depicted in FIG. 10.

The communications module 135, shown in FIG. 1A, receives information from, and transmits information to, the inventory application 160, the store computing device 126, and the user computing device 140, via the network 110.

The regional sales database 131, shown in FIG. 1A, is a data store that stores information about individual item sales at regional stores. The regional sales information is accessed via communications module 135. Data available on the regional sales database 131 includes, but is not limited to, the inventory of regional stores and the item sales data from regional stores.

Server one 150, shown in FIG. 1A, includes a memory 151, communications module 153, and an inventory application 160. The communications module 153 can communicate with the user computing device 140, the communications module 135 on server two 130, and the store computing device 126 via the network 110. The communications module 153 receives information from, and transmits information to, the communications module 135, the store computing device 126, and the user computing device 140 via the network 110. Server one 150 may include internal and external hardware components, as depicted and described in further detail below with reference to FIG. 8. In other embodiments, server one 150 may include internal and external hardware components, as depicted and described in further detail below with respect to FIG. 9, and operate in a cloud computing environment, as depicted in FIG. 10.

Figure 1B:
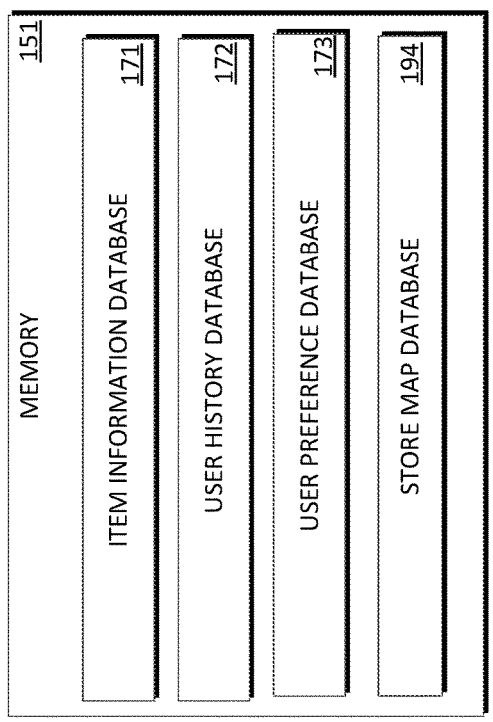

The memory 151 is a data store to store item source information, user history profiles, and user preferences. The memory 151, as shown in FIG. 1B, includes an item information database 171, a user history database 172, a user preference database 173, and a store map database 194.

The item information database 171 is a data store that stores item source information, for example, the farm or factory that the item 125 was shipped from, information about pesticides or GMO, nutritional information about the item 125 (e.g. allergen information, dietary information, calorie and carbohydrate information), ingredient lists, or any other item 125 information.

The user history database 172 is a data store that stores data about user purchase history. User purchase history data includes the items 125 purchased, including the brand and source, the quantity purchased, and the date and time of the purchase.

The user preference database 173 is a data store that stores user inputs, for example, recipes, shopping lists, survey results from preference surveys, dietary restrictions (for example, gluten-free, kosher, vegetarian, vegan, dairy-free), allergen information, and more.

The store map database 194 is a data store that stores the store shelving map, which also shows security components (not shown) in the store 120 (for example. cameras, sensors used to track items 125 can be also used for security components), and the item placement map. The store shelving map is a map of the store's infrastructure, including shelving, display cases, and security component placement. This map includes maps of sensors 123 throughout the store, including cameras on the walls, on shelves, or other scanning devices. These sensors 123, as described above, keep track of the current item 125 location on the shelf to update the item placement map. The item placement map reflects the up-to-date positioning of items 125 throughout the store. Each time an item 125 is received by the store 120, the item 125 is scanned using its UPC, RFID, or other identifying mark. This information is stored in the item database 129. When the item 125 is placed on the floor of the store 120, sensors 123 throughout the store track the item 125 location and update the item placement map. For example, when a user removes an item 125 from the shelf, the item 125 is identified by the sensors 123. The item placement map is updated to show that the item 125 is no longer on the shelf. When the user places the item 125 back on a different shelf, the sensors 123 detect the item 125 new location and update the item placement map. When the user purchases the item 125, the item database 129 and the item placement map are both updated to reflect that the item 125 is no longer in the store.

Figure 1C:
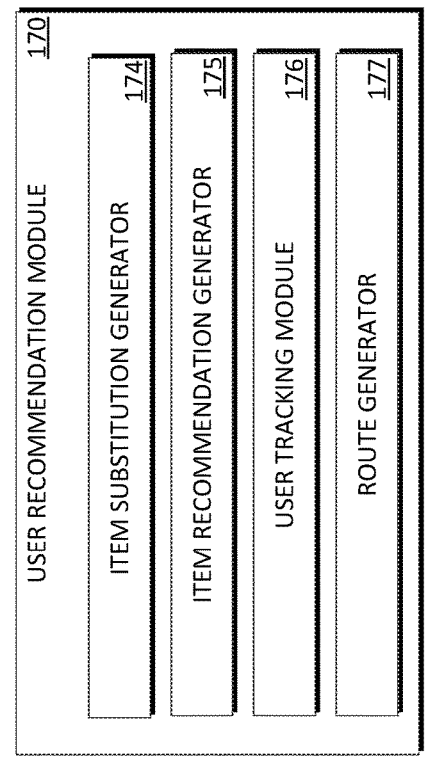
Figure 1E:
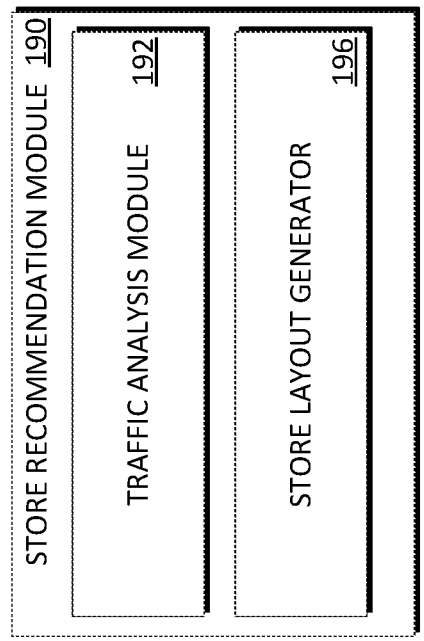
Figure 1D:
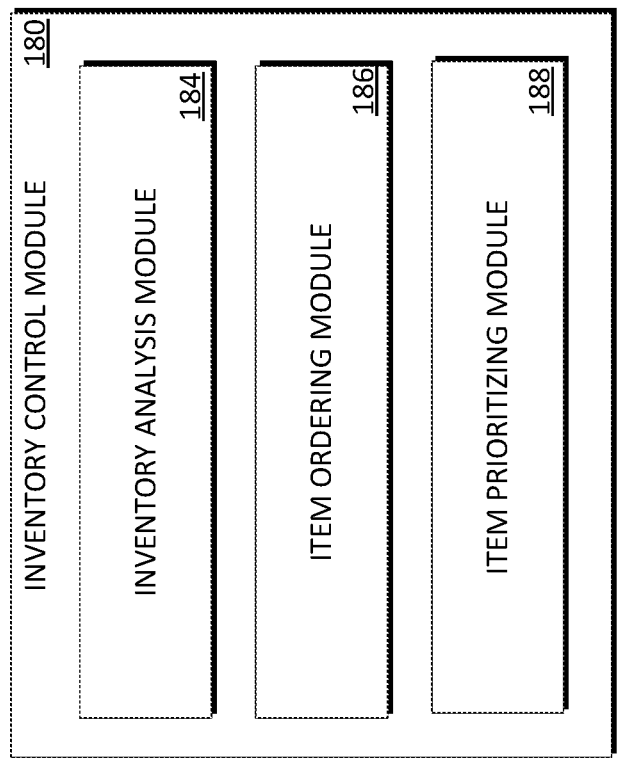

The inventory application 160 includes user recommendation module 170, inventory control module 180 and store recommendation module 190, as shown in FIGS. 1C, 1D, and 1E. The user recommendation module 170, as shown in FIG. 1C, accesses information stored in the memory 151. The user recommendation module 170 includes an item substitution generator 174, an item recommendation generator 175, a user tracking module 176, and a route generator 177. The inventory application analyzes information about user purchase history retrieved from the user history database 172, user preferences from the user preference database 173, information about item inventory in the store 120 from the item database 129, and item 125 specific information (such as source, nutritional information, etc.) from the item information database 171. This analysis is to generate item 125 recommendations and shopping routes for users in the store 120.

The item substitution generator 174 retrieves stored item data from the item information database 171, retrieves user purchase history from the user history database 172, and retrieves user preferences from the user preference database 173. The item substitution generator 174 uses the received data to generate item 125 substitutions when the user has a recipe, a shopping list, or when requested by the user. This is helpful for users who have dietary restrictions or when the user's desired item 125 is out of stock. It also addresses issues for users who begin a new dietary regime. For example, a person who eliminates gluten from his diet might be overwhelmed by finding gluten-free item substitutions for the items he normally purchases. The item substitution generator 174 can suggest those items 125 to the user, eliminating the need for the user to actively search those items 125 out.

The user will typically input a shopping list, recipe, or a request for an item substitution, into his user computing device 140. The item substitution generator 174 receives that information on the user computing device 140. Additionally, the item substitution generator 174 receives the user preferences from the user preference database 173, receives the item information database 171, the user history database 172 and the item database 129. The item substitution generator 174 uses information from these databases to generate in-stock items 125 that meet the requirements set by the user purchase history, the user preferences, and the recipe, list input, or the request for an item substitution, by the user on the user computing device 140. The item substitution generator 174 compares the user's inputted list, recipe, or request for an item substitution, to the item database 129 to determine whether the user's desired item 125 is in stock. When it is not, the item substitution generator 174 generates an equivalent item 125 suggestion for the user.

Additionally, the item substitution generator 174 compares the items 125 on the user's list, recipe, or request for an item substitution to the item information database 171. When something on the user's list, recipe, or his request for an item substitution does not comply with a dietary restriction or preference from the user history database 172, as compared to information from the item information database 171, the item substitution generator 174 generates an alternative item 125 that meets those requirements. The item substitution generator 174 transmits all item recommendations to the user computing device 140 to be displayed by GUI 141.

The item recommendation generator 175 suggests new items 125 to the user based on his purchase history. The item recommendation generator 175 receives the user purchase history from the user history database 172, any stored preference from the user preference database 173, and item 125 information from the item information database 171. The item recommendation generator 175 analyzes the user purchase history and the user preferences and determines trends with the user purchases. The item recommendation generator 175 then uses the item information database 171 to finds items 125 that follow the determined user purchase trends. The item recommendation generator 175 can also receive sale data from the regional sales database 131 to analyze whether an item 125 is trending regionally. When the store 120 has an item 125 in stock that is determined to be trending regionally, the item recommendation generator can alert the user to the stocking of that item 125. The item recommendation generator 175 then transmits these recommendations to the user computing device 140 for display. For example, when a user tends toward a particular brand, the item recommendation generator 175 could alert the user to new items 125 in the store from that brand. As another example, when the user typically makes a purchase every time they go to the store but forgot to put it on his list, the item recommendation generator could alert the user and suggest they add it to his list.

The user tracking module 176 receives the location of the user within the store 120 from the sensors 123 throughout the store 120, as well as from the location information on the user computing device 140, and transmits an alert to the user computing device 140 to be displayed when an item 125 on his list is close by. Additionally, by tracking the user, the user tracking module could transmit an alert to the user computing device 140 to display items 125 nearby that are on sale or items 125 nearby that are running out, as determined by the inventory control module 180.

The route generator 177 generates the user's shopping route throughout the store 120 by receiving the location of each item 125 on the users shopping list, recipe, and/or substitution item 125 from the store map database 194. The route generator 177 identifies each item 125 on the user's list, recipe, and/or substitution item, and receives the location of each item 125 within the store using the store map database 194. The route generator 177 receives in-store traffic information from the traffic analysis module 192. The route generator analyzes the information from the store map database 194 and the traffic analysis module 192 to generate a route through the store 120 to reach each item 125. The route generator 177 transmits the route to the user computing device 140 for display.

The inventory control module 180, shown in FIG. 1D, accesses inventory data stored in item database 129. The inventory control module 180 includes an inventory analysis module 184, an item ordering module 186, and an item prioritizing module 188.

The inventory analysis module 184, receives inventory information from the item database 129 and analyzes the received inventory information to determine trends. The determined trends can be, for example, when the quantity of an item 125 is decreasing rapidly, when an item 125 sells very infrequently, when an item 125 sells slowly, when an item 125 sells seasonally, when an item 125 does not sell, and/or other trends determined from the data. Another trend that the inventory analysis module 184 might is the quality of the item 125 being sold. For example, the inventory analysis module 184 could determine whether a decrease in sales of an item 125 is due to a supplier producing poor quality perishable, or non-perishable items 125. The inventory analysis module 184 can instruct the item ordering module 186 to place an order for such an item 125 based on the determined trends.

Additionally, the inventory analysis module 184 can receive the data on the regional sales database 131 to analyze the popularity of an item 125 at another regional store. The inventory analysis module 184 can instruct the item ordering module 186 to place an order for such an item 125.

The item ordering module 186 receives data from the item database 129 to determine the quantity of item 125 in stock. The item ordering module 186 communicates with the inventory analysis module 184 to assess sales trends of an item 125, for example when the quantity of an item 125 is rapidly decreasing in stock. The item ordering module 186 additionally communicates with the item prioritizing module 188 to determine when an order for an item 125 must be placed. The item ordering module 186 transmits ordering information to the store computing device 126 for display.

The item prioritizing module 188 receives data from the item database 129 about inventory quantity and receive data from the inventory analysis module 184 about sales trends. The item prioritizing module 188 determines a value ranking for an item 125, wherein the value ranking for an item 125 is constantly updated. This value ranking considers the item's 125 sale quantities and frequencies in order to put a value on the item's 125 normal "popularity" in-store. The value ranking further considers sales data from the item database 129 and sales trends from the inventory analysis module 184. When the item 125 value ranking is greater than or equal to a first predetermined threshold value, the item prioritizing module 188 alerts the item ordering module 186 and the item 125 is ordered immediately. When the item's 125 value ranking is less than the first predetermined threshold value, the item prioritizing module 188 communicates to the item ordering module 186 that the item 125 can be ordered as normally scheduled. Furthermore, when the value ranking of item 125 is less than a second predetermined threshold value, the item prioritizing module 188 recommends to the item ordering module 186 to cancel any outstanding orders for item 125.

The item prioritizing module 188 can adjust these value rankings depending on season, holiday, or another trend. For example, a certain brand of chocolate might have a predetermined threshold of "X" as calculated by the item prioritizing module 188. If, around Valentine's Day, the chocolate is in higher demand due to the holiday, the item prioritizing module 188 might calculate the chocolate's value ranking to be equal to "X+1". The item prioritizing module 188 would then alert the item ordering module 186 to place a rush order for the chocolate to accommodate for the increased holiday demand.

The store recommendation module 190, shown in FIG. 1E, includes the traffic analysis module 192 and the store layout generator 196. The store recommendation module 190 receives store map data from the store map database 194, receives user tracking data from sensor 123 and/or the user computing device 140, receives sales data from the item database 129, and any other data necessary.

The traffic analysis module 192 receives in-store user tracking data from the sensors 123 within the store 120 and the user computing device 140, and analyzes this data for traffic patterns and/or for traffic build-ups. The traffic patterns and/or traffic build-ups could be used for, but is not limited to, dispersing traffic around a high-traffic area or to alert the store computing device 126 to a spill or security problem. An example of a security problem might be user crowding around a high-theft item 125. This user crowding around the item 125 might indicate a theft attempt. In this situation, the traffic analysis module 192 would alert the store computing device 126 to the crowd, and the store layout generator 196 could recommend a new item layout that moves the high-theft item 125 to a different location within the store 120.

The store layout generator 196 uses traffic pattern data from the traffic analysis module 192 to transmit to the store computing device 126 a new item layout for the store 120, which is displayed. The new item layout could recommend placing the items 125 such that no part of the store will ever have a traffic build-up. Additionally, the items 125 could be placed such that an item 125 with a poor sales history could be placed in a high-traffic area to increase sales.

Figure 2:
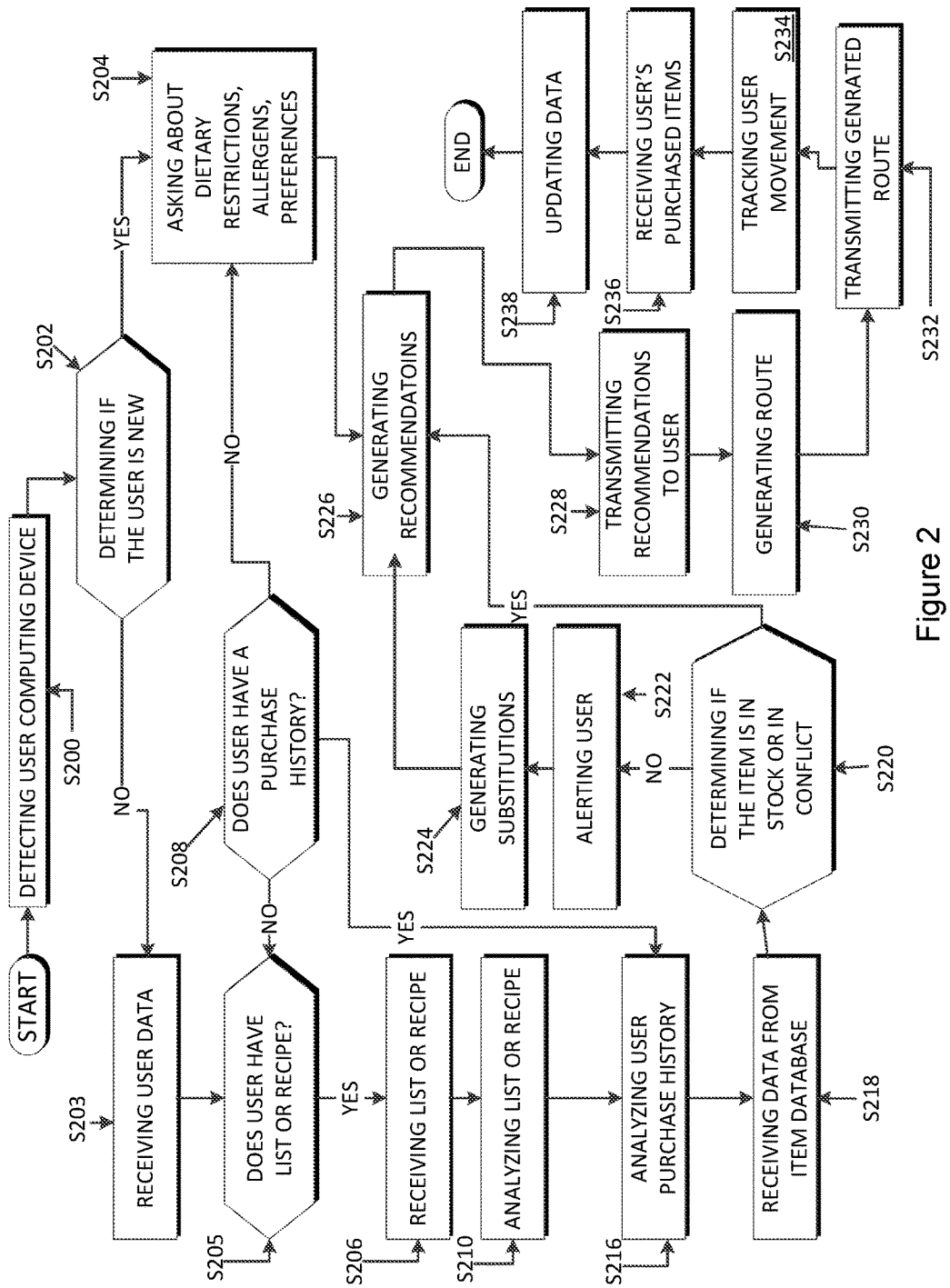
FIG. 2 is a flowchart depicting operational steps to receive user data and transmit user recommendations within the environment of FIGS. 1A through 1E, in accordance with an embodiment of the present invention.

FIG. 2 depicts the process by which the inventory application 160 guides the user shopping experience. Server One 150 detects the user computing device 140 (S200). The user recommendation module 170 determines whether the user is a new user (S202) by analyzing whether the user has registered his user computing device 140 with the inventory application 160. When the user is a new user to the inventory application 160, the user recommendation module 170 transmits questions to the user computing device 140 about dietary restrictions, allergen information, user preferences, a shopping list, and/or a recipe (S204). The user can input his response in the graphical user interface 141 and the user computing device 140 transmits the inputted response to the user recommendation module 170 (S204). The user recommendation module 170 generates item recommendations for the user based on the received inputs (S226).

For a previously registered user computing device 140, the user recommendation module 170 receives user purchase history from the user history database 172 and receives user preferences from the user preference database 173 (S203). The user recommendation module 170 then determines whether the user has input a shopping list or recipe (S205). When the user has not input a shopping list or recipe, the user recommendation module 170 determines if it received any user purchase history (S208). When there is no user purchase history available in the user history database 172, the inventory application transmits questions to the user computing device 140 about dietary restrictions, allergen information, user preferences, and prompts the user to enter a list (S204). The user can input his response in the graphical user interface 141 and the user computing device 140 transmits the inputted response to the user recommendation module 170 (S204). The user recommendation module 170 generates item recommendations for the user based on this gathered information (S226). When the user recommendation module 170 determines that the user does have a purchase history in the user history database 172, then the user recommendation module 170 analyzes purchase data from the user history database 172 and analyzes the user preference data from the user preference database 173 (S216).

The user recommendation module 170 receives the list or recipe input by the user (S206). The user recommendation module analyzes the received list or recipe (S210). The user recommendation module 170 analyzes purchase data from the user history database 172 and analyzes the user preference data from the user preference database 173 (S216).

The user recommendation module 170 receives item stock information from the item database 129 (S218) to determine if the items 125 on the user's list or recipe are in stock and the item substitution generator 174 determines whether the items 125 conflict with the user preferences (S220). When the item is not in stock or generates a conflict, the user recommendation module 170 transmits this information to the user computing device 140 for display (S222). The item substitution generator 174 receives information from the item information database 171, the user history database 172, the user preference database 173, and the item database 129. The item substitution generator 174 analyzes this information to generate item substitutions for the user in cases where his desired item is out of stock, noncompliant with his dietary restrictions, or when the user requests an item substitution (S224). The item recommendation generator 175 generates item recommendations for the user based on the item 125 being in stock, the generated substitutions from the item substitution generator 174, the user's list, recipe, and/or received user preferences (S226).

The user recommendation module 170 transmits the generated recommendations to the user computing device 140 for display (S228). The route generator 177 receives the recommended item 125 locations within the store 120 from the store map database 194 and generates a route, a map, a guide, or directions to each item 125 location within store 120 (S230). This generated route has a starting pointed based on the user current location as determined by the user tracking module 176. The route generator 177 further generates the route based on traffic patterns within the store from the traffic analysis module 192, and the location of each recommended item 125 within the store 120. The generated route is then transmitted to the user computing device 140 for display (S232). The user tracking module 176 tracks the user's movement in the store 120 (S234). The items 125 in the store 120 have some type of identification, such as a UPC, RFID tag, or other form of identification that is recognized by the in-store sensors 123. These sensors 123 communicate each item's 125 location to the store map database 194, for example, when the location of the item 125 changes within the store or when a user purchases the item (S236). The user recommendation module 170 then updates the user history database 172, the user preference database 173, the item database 129, and the store map database 194 based on the received tracking data (S238).

Figure 3:
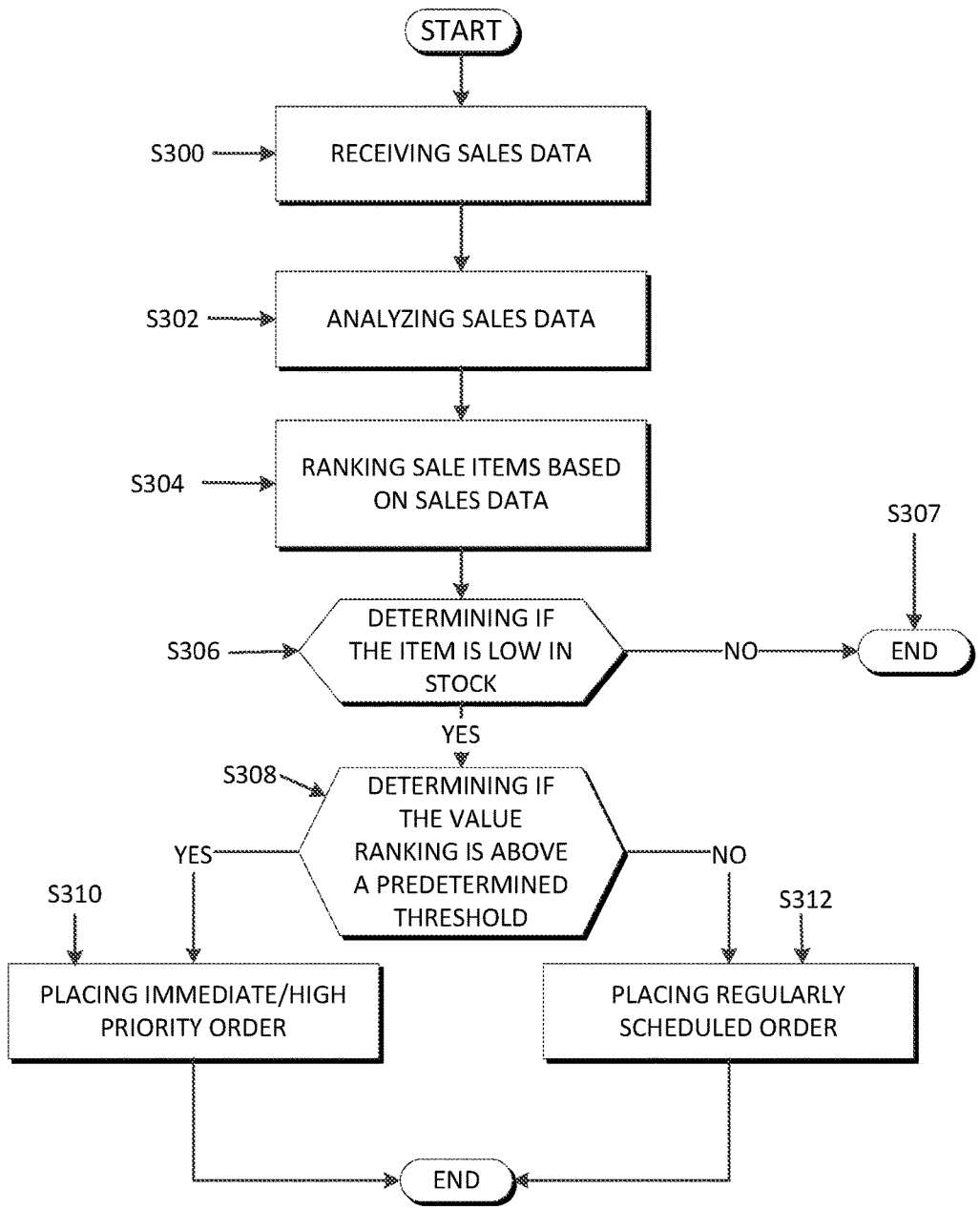
FIG. 3 is a flowchart depicting operational steps to receive sales data and to intelligently place inventory orders within the environment of FIGS. 1A through 1E, in accordance with an embodiment of the present invention.

FIG. 3 depicts the process by which the inventory application 160 uses sales data to guide item 125 ordering for the store 120. The inventory analysis module 184 receives item inventory quantities from the item database 129 (S300). The inventory analysis module 184 analyzes the data from the item database 129 to determine sales trends, for example, popular items, seasonal trends, items with decreasing sales, and other trends (S302). The item prioritizing module 188 receives the sales trend data from the inventory analysis module 184 to assign a value ranking to each of the items 125 (S304). The item ordering module 186 receives item 125 stock information from the item database 129 to determine if an item 125 is low in stock (S306). When the item 125 in stock quantity is sufficient then the inventory application 160 stops and waits until the next inventory run (S307). When the item 125 is low in stock, the inventory analysis module 184 determines whether the value ranking of the item 125 is greater than the predetermined threshold value (S308). When the item's 125 value ranking is greater than the predetermined threshold value, the item ordering module 186 receives instruction from the inventory analysis module 184 to place an immediate/high priority order for that item 125 (S310). When the item's 125 value ranking is less than the predetermined threshold value, the item ordering module 186 receives instruction from the inventory analysis module 184 to place a regularly scheduled order for that item 125 (S312).

Figure 4:
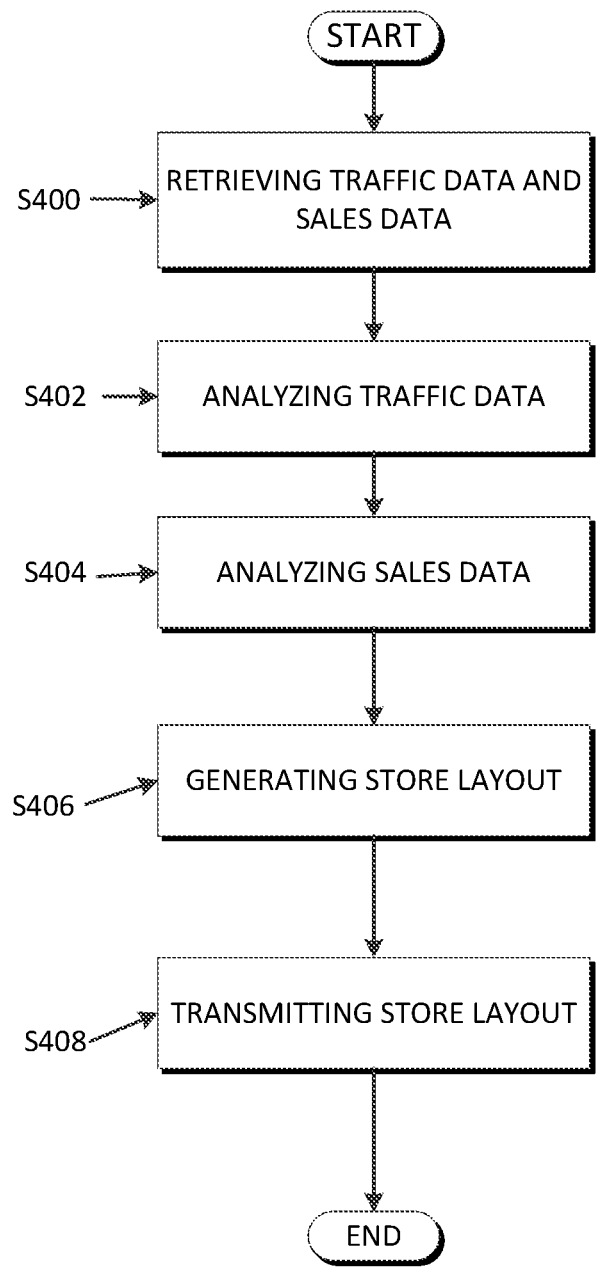
FIG. 4 is a flowchart depicting operational steps to receive traffic pattern data and sales data and to generate an optimal store layout within the environment of FIGS. 1A through 1E, in accordance with an embodiment of the present invention.

FIG. 4 depicts the process by which the inventory application 160 generates layout recommendations for the store 120. The store recommendation module 190 receives traffic data from the sensors 123 and the user computing device 140, and receives item 125 sales data from the item database 129 (S400). The traffic analysis module 192 analyzes user tracking data from sensors 123 within store 120 and the user computing device 140 for traffic patterns and/or for traffic build-ups (S402). The store layout generator 196 receives item 125 sales data from the item database 129 (S400). The inventory analysis module 184 analyzes item 125 sales data to determine item 125 sales trends (S404). The store layout generator 196 receives traffic data from the traffic analysis module 192 and analyzes the traffic data together with the sales data to generate a new store layout (S406). The store layout generator 196 transmits a new item layout for the store 120 to the store computing device 126 for display (S408).

Figure 5:
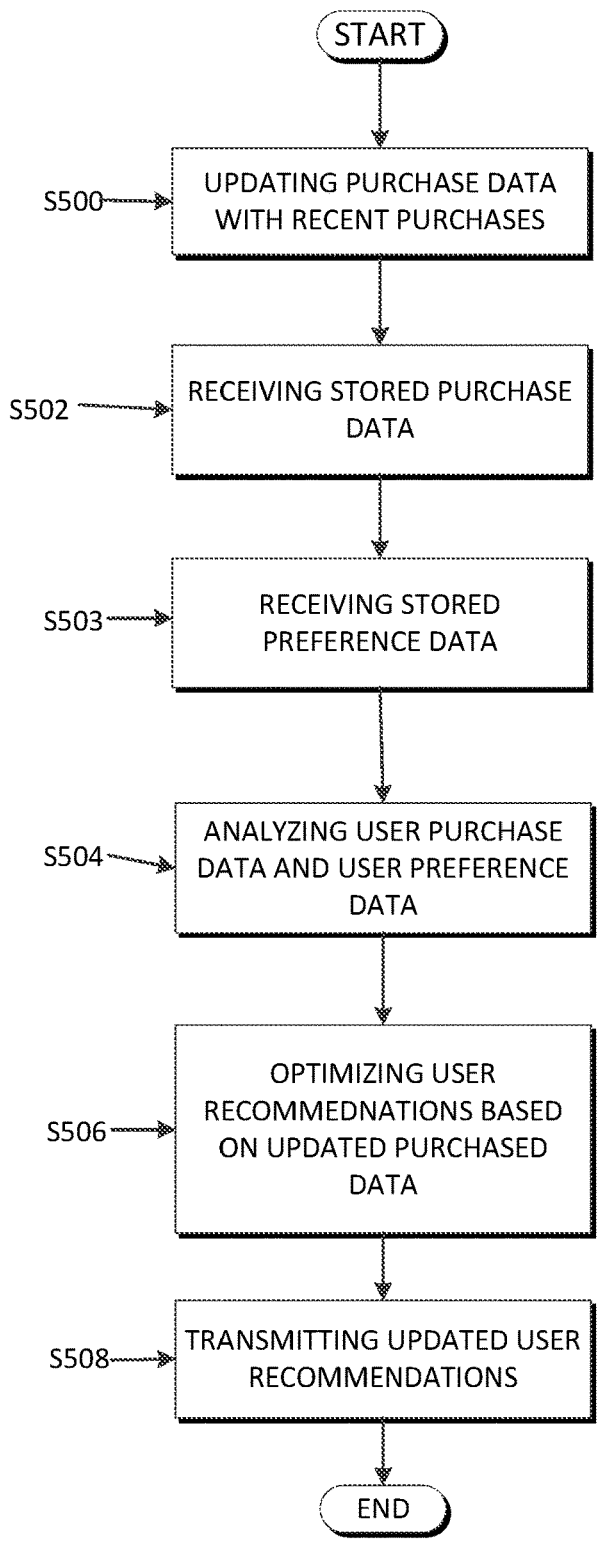
FIG. 5 is a flowchart depicting operational steps to receive a user purchase history and update user preferences based on new sales data within the environment of FIGS. 1A through 1E, in accordance with an embodiment of the present invention.

FIG. 5 depicts the process by which the inventory application 160 updates user recommendations based on user purchase history. The user history database 172 is updated with new user purchase data after each shopping trip (S500). The item recommendation generator 175 receives user purchase history from the user history database 172 (S502). The item recommendation generator 175 receives user preference information from the user preference database 173 (S503). The item recommendation generator 175 analyzes the user purchase history data and the user preference data (S504). The item recommendation generator 175 generates item 125 recommendations for the user based on his purchase history and his preferences (S506). The item recommendation generator 175 transmits these generated recommendations to the user computing device 140 for display (S508).

Figure 6:
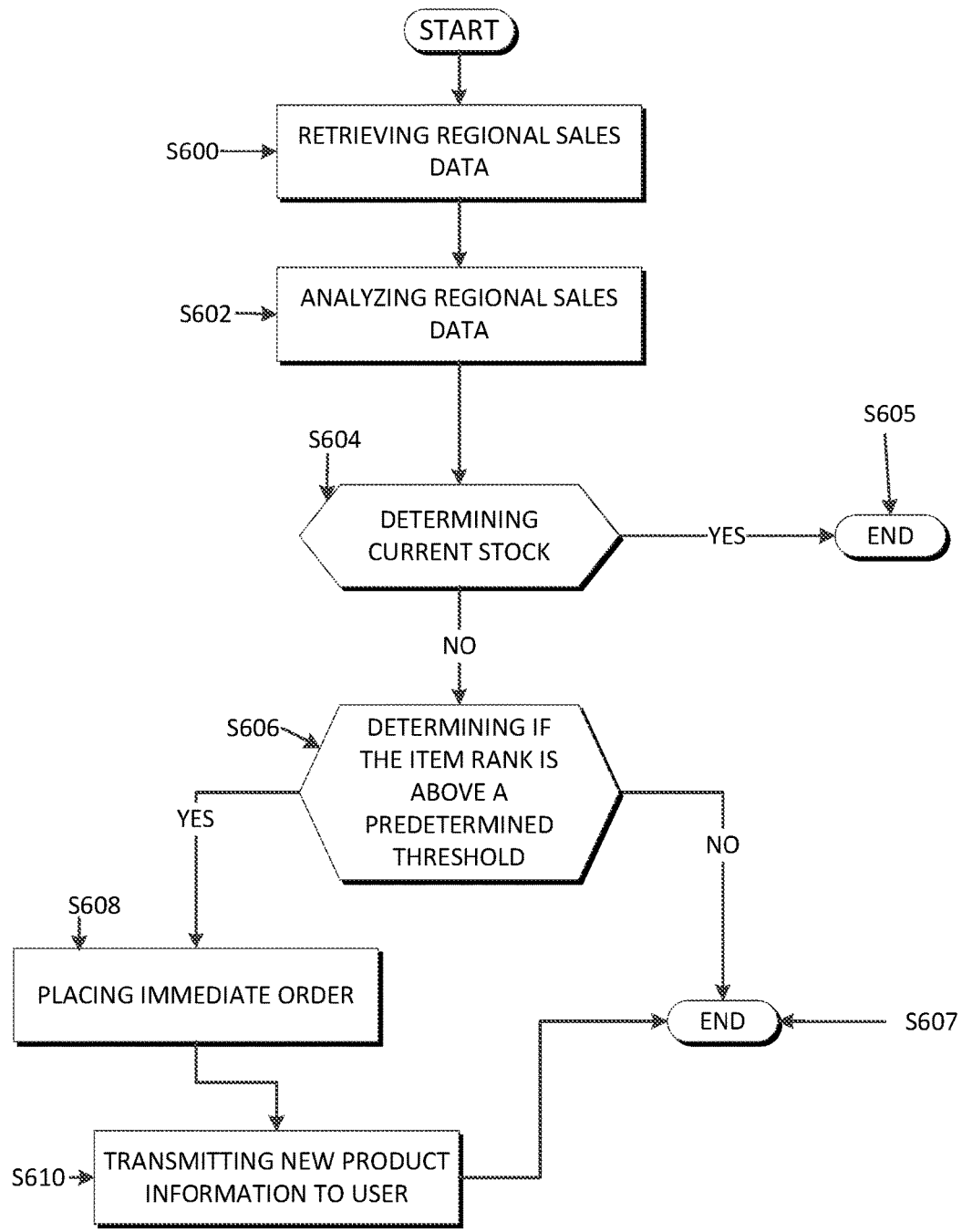
FIG. 6 is a flowchart depicting operational steps to receive regional sales data and alert users when a high-demand item has been restocked within the environment of FIGS. 1A through 1E, in accordance with an embodiment of the present invention.

FIG. 6 depicts the process by which the inventory application 160 uses regional sales data to guide item 125 ordering for the store 120. The inventory analysis module 184 receives regional sales data from the regional sales database 131 (S600). The inventory analysis module analyzes the regional sales data to determine regional sales trends (S602). The inventory analysis module 184 receives stock information from the item database 129 to determine whether an item is in stock (S604). When the item 125 in stock quantity is sufficient then the inventory application 160 stops and waits until the next inventory run (S605). When the item is not in stock, the inventory analysis module 184 determines whether the value ranking of the item 125 is greater than the predetermined threshold value (S606). When the item 125 value ranking is less than the predetermined threshold value then the inventory application 160 stops and waits till the next inventory run (S607). When the item's 125 value ranking is greater than the predetermined threshold value, the item ordering module 186 receives instruction from the inventory analysis module 184 to place an immediate order for that item 125 (S608). When the item 125 is received by the store 120, the inventory application 160 transmits a message about the stocking of the new item 125 to the user computing device 140 for display (S610).

Figure 7:
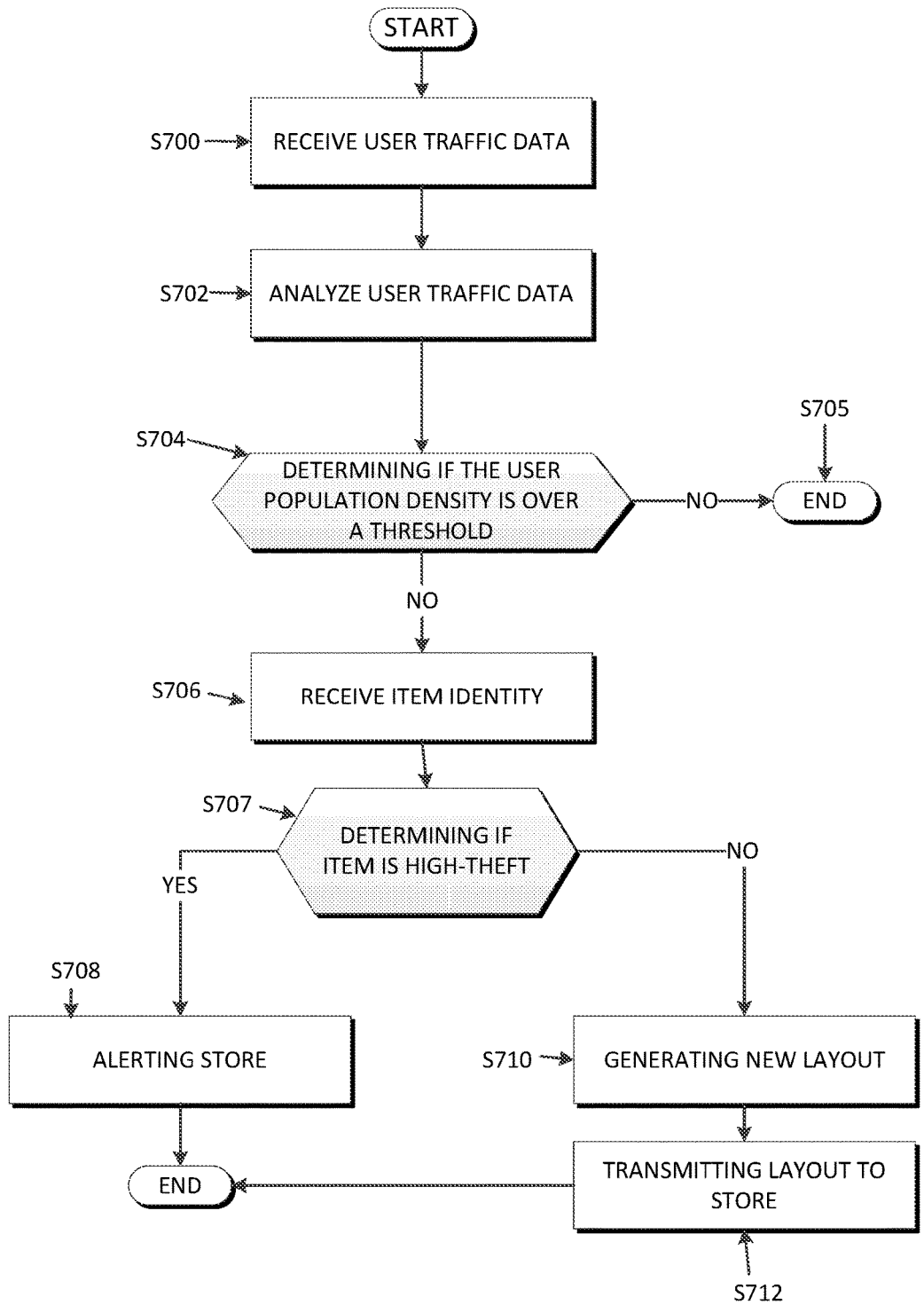
FIG. 7 is a flowchart depicting operational steps to receive real-time in-store traffic data and alert the store to crowding around high-theft items within the environment of FIGS. 1A through 1E, in accordance with an embodiment of the present invention.

FIG. 7 depicts the process by which the inventory application 160 uses in-store user traffic data to address a security situation in the store 120. The traffic analysis module 192 receives user tracking information from the user tracking module 176, and from the user computing device 140 (S700). The traffic analysis module 192 analyzes the user tracking data to determine whether the users are clustered in certain areas within the store 120 (S702). The traffic analysis module 192 determines whether the user population density in an area is greater than a predetermined user population density threshold value (S704). The predetermined user population density value can vary based on the type of store, the time of year, the product around which the users are crowding, and/or other factors. For example, a reasonable user population density around roses on Valentine's Day would be different than on another day during the year. The predetermined user population density threshold value is initially set by the inventory application 160 administrators in a configurable profile. The predetermined user population density threshold value can be set per item, per store area or department, per season or holiday, or a combination of these and/or other factors.

When the user population density is less than the predetermined user population density threshold value, the traffic analysis module 192 stops and waits until the next traffic run (S705). When the user population density is greater than or equal to the predetermined user population density threshold value, the traffic analysis module 192 receives information from the store map database 194 to determine which item 125 the users are clustering around (S706). The inventory analysis module 184 determines whether the item 125 around which the users are clustering is a high-theft item (S707). When the item 125 that the users are clustering around is a high-theft item, the traffic analysis module 192 transmits an alert to the store computing device 126 for display (S708).

When the item 125 that the users are clustering around is not a high-theft item, the traffic analysis module 192 directs the store layout generator 196 to generate a new store layout (S710). This new store layout will recommend relocating the items 125 to a new location within store 120 to change the flow user traffic throughout the store 120. The store layout generator transmits the new store layout to the store computing device 126 to be displayed by graphical user interface 128 (S712).

Figure 8:
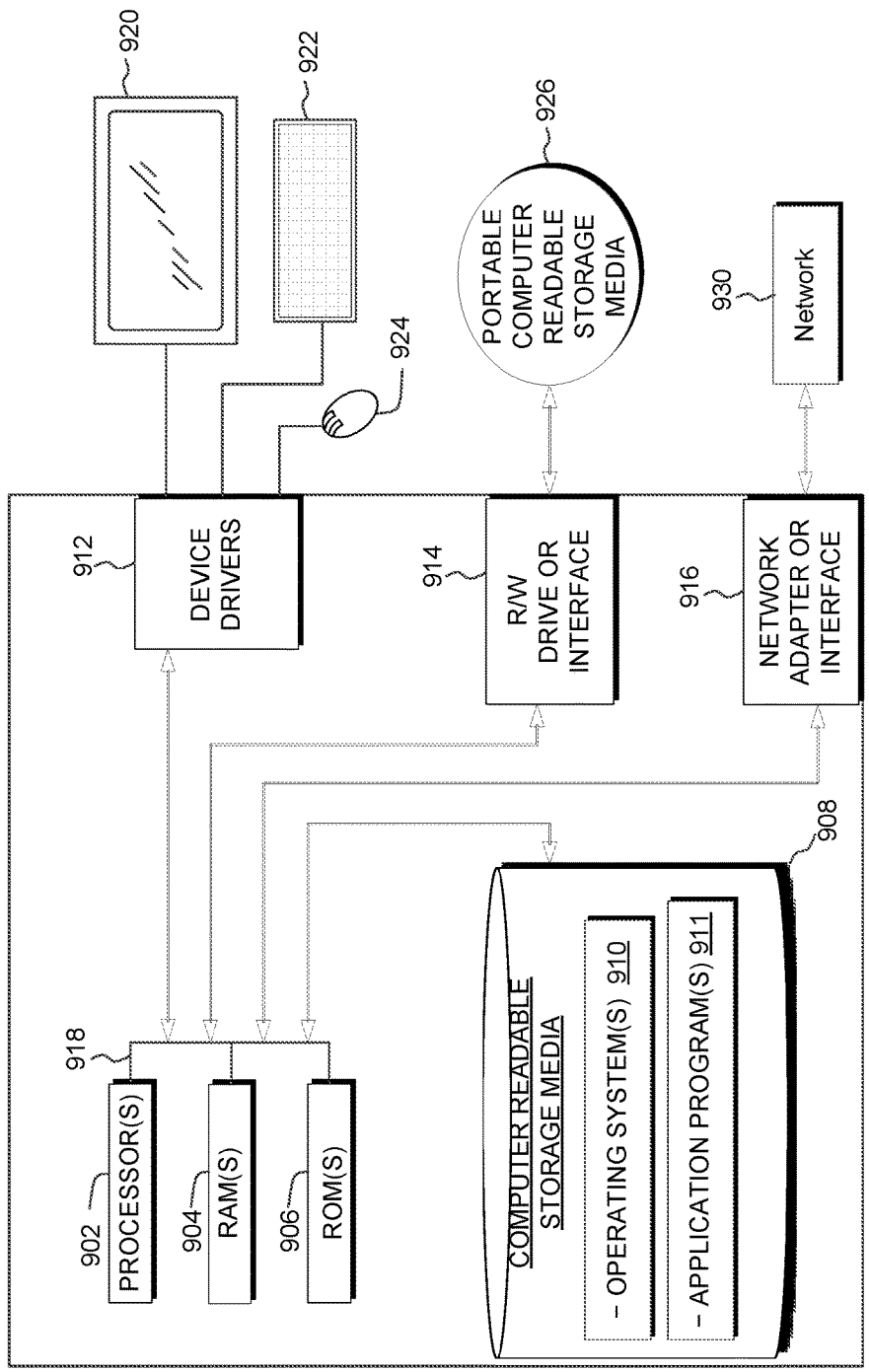
FIG. 8 is a block diagram of components of a computing device of the system to intelligently manage store inventory using a mobile application from FIGS. 1A through 1E, in accordance with embodiments of the present invention.

FIG. 8 depicts a block diagram of components of store computing device 126 of the system for intelligently managing store inventory 100 of FIG. 1A, in accordance with an embodiment of the present invention. It should be appreciated that FIG. 8 provides only an illustration of one implementation and does not imply any limitations with regard to the environments in which different embodiments may be implemented. Many modifications to the depicted environment may be made.

Server one 150, server two 130, the store computing device 126, and the user computing device 140 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

Server one 150, server two 130, the store computing device 126, and the user computing device 140 may also include a R/W drive or interface 914 to read from and write to one or more portable computer readable storage media 926. Application programs 911 on Server one 150, server two 130, the store computing device 126, and the user computing device 140 may be stored on one or more of the portable computer readable storage media 926, read via the respective R/W drive or interface 914 and loaded into the respective computer readable storage media 908.

One or more operating systems 910, and one or more application programs 911, for example, inventory application 160 (FIG. 1A), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server one 150, server two 130, the store computing device 126, and the user computing device 140 may also include a R/W drive or interface 914 to read from and write to one or more portable computer readable storage media 926. Application programs 911 on Server one 150, server two 130, the store computing device 126, and the user computing device 140 may be stored on one or more of the portable computer readable storage media 926, read via the respective R/W drive or interface 914 and loaded into the respective computer readable storage media 908.

Server one 150, server two 130, the store computing device 126, and the user computing device 140 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on Server one 150, server two 130, the store computing device 126, and the user computing device 140 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Server one 150, server two 130, the store computing device 126, and the user computing device 140 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program item at any possible technical detail level of integration. The computer program item may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program items according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program items according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
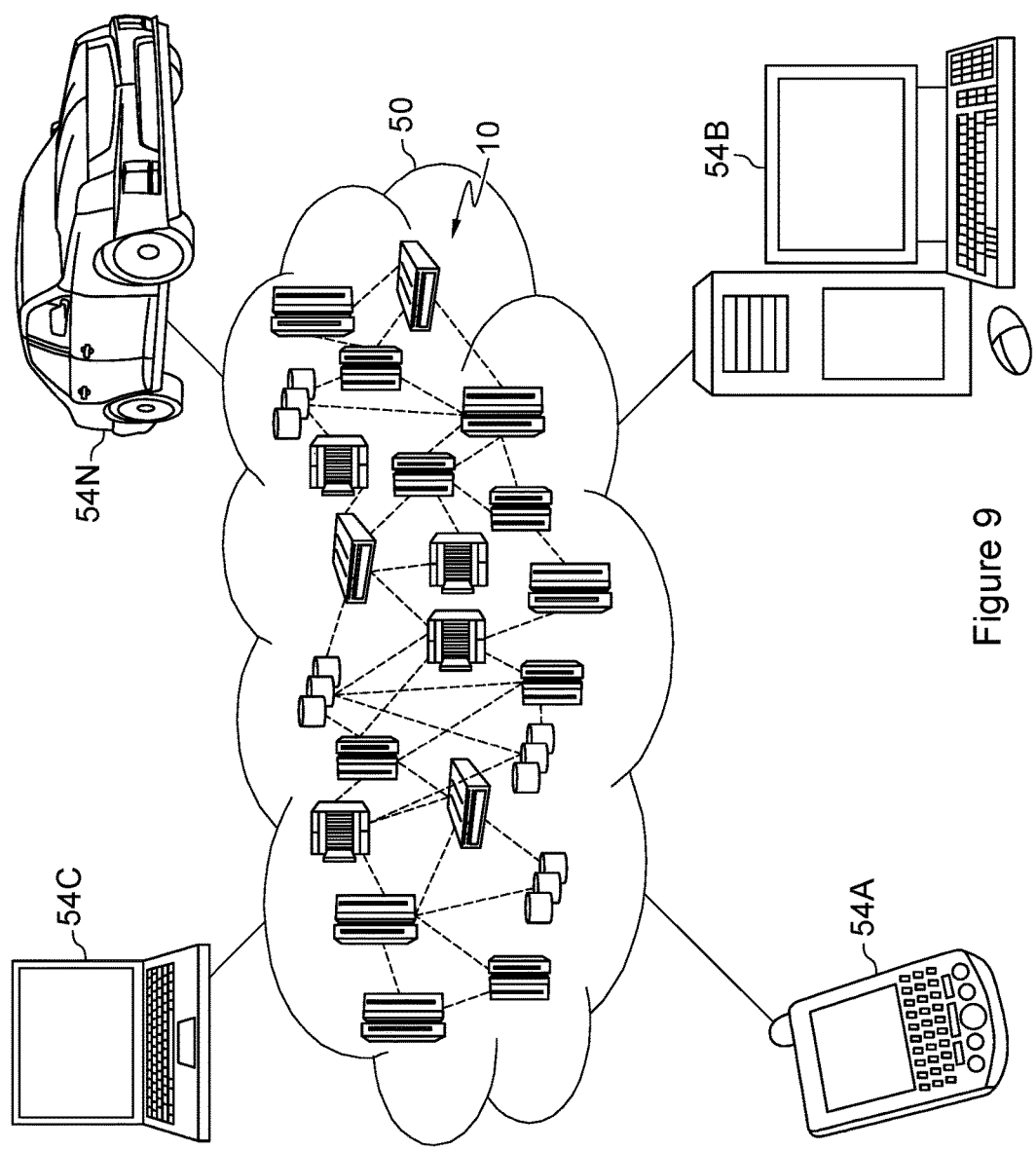
FIG. 9 depicts a cloud computing environment according to an embodiment of the present invention.
Figure 10:
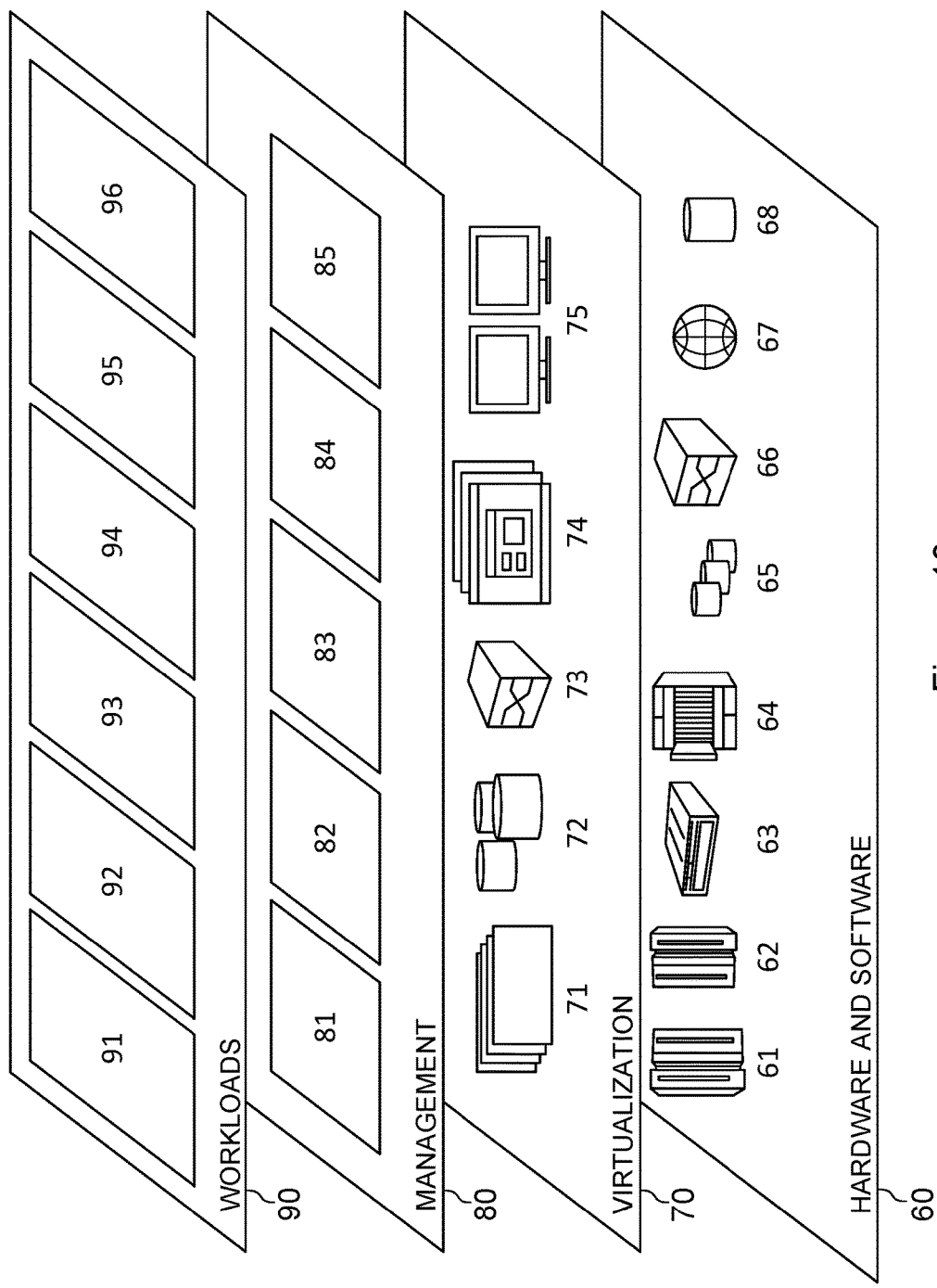
FIG. 10 depicts abstraction model layers according to an embodiment of the present invention.

Referring now to FIG. 9, illustrative cloud computing environment (50) is depicted. As shown, cloud computing environment (50) includes one or more cloud computing nodes (10) with which local computing devices used by cloud consumers, such as, for example, personal digital assistant (PDA) or cellular telephone (54A), desktop computer (54B), laptop computer (54C), and/or automobile computer system (54N) may communicate. Nodes (10) may communicate with one another. They may be grouped (not shown) physically or virtually, in one or more networks, such as Private, Community, Public, or Hybrid clouds as described hereinabove, or a combination thereof. This allows cloud computing environment (50) to offer infrastructure, platforms and/or software as services for which a cloud consumer does not need to maintain resources on a local computing device. It is understood that the types of computing devices (54A-N) shown in FIG. 9 are intended to be illustrative only and that computing nodes (10) and cloud computing environment (50) can communicate with any type of computerized device over any type of network and/or network addressable connection (e.g., using a web browser).

Referring now to FIG. 10, a set of functional abstraction layers provided by cloud computing environment (50) (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer (60) includes hardware and software components. Examples of hardware components include: mainframes (61); RISC (Reduced Instruction Set Computer) architecture based servers (62); servers (63); blade servers (64); storage devices (65); and networks and networking components (66). In some embodiments, software components include network application server software (67) and database software (68).

Virtualization layer (70) provides an abstraction layer from which the following examples of virtual entities may be provided: virtual servers (71); virtual storage (72); virtual networks (73), including virtual private networks; virtual applications and operating systems (74); and virtual clients (75).

In one example, management layer (80) may provide the functions described below. Resource provisioning (81) provides dynamic procurement of computing resources and other resources that are utilized to perform tasks within the cloud computing environment. Metering and Pricing (82) provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal (83) provides access to the cloud computing environment for consumers and system administrators. Service level management (84) provides cloud computing resource allocation and management such that required service levels are met. Service Level Agreement (SLA) planning and fulfillment (85) provide pre-arrangement for, and procurement of, cloud computing resources for which a future requirement is anticipated in accordance with an SLA.

Workloads layer (90) provides examples of functionality for which the cloud computing environment may be utilized. Examples of workloads and functions which may be provided from this layer include: mapping and navigation (91); software development and lifecycle management (92); virtual classroom education delivery (93); data analytics processing (94); transaction processing (95); and inventory application 96.

Based on the foregoing, a computer system, method, and computer program item have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and his equivalents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A non-transitory computer program product for intelligently managing a store inventory stock, the non-transitory computer program product comprising:

one or more non-transitory computer-readable storage media and program instructions stored on the one or more non-transitory computer-readable storage media, the program instructions comprising:

detecting, by a computer, a user computing device when the user computing device enters a store;

receiving a user preference information from a user preference database, wherein the received user preference information comprises dietary restrictions;

receiving a list and/or a recipe inputted into an application by a user, wherein the list and/or the recipe includes at least one item that the user plans to purchase;

identifying using sensors, the at least one item included within the list and/or the recipe that the user plans to purchase, wherein the sensors are registering movement of a plurality of items off a shelf in the store inventory stock and connected to the computer;

based on determining that the at least one item included within the list and/or the recipe conflicts with the dietary restrictions:

generating at least one substitution item for the at least one item included within the list and/or the recipe that conflicts with the dietary restrictions and for the at least one substitution item:

replacing the at least one item included within the list and/or the recipe that conflicts with the dietary restrictions from the received user preference information with the generated at least one substitution item when the at least one substitution item is in the store inventory stock;

generating a route through the store based on a store layout map, an item placement map, and the replaced at least one substitution item included within the list and/or the recipe, wherein the item placement map is updated based on data from the sensors; and transmitting the route to the user computing device to be displayed by a graphical user interface.

2. The non-transitory computer program product of claim 1, wherein the store layout map includes a map of a store shelving and/or other store infrastructure maps;

wherein the item placement map includes information about a location of each of the items on store shelves;

wherein a user purchase history includes information about previous purchases by the user; and wherein the user preference information includes at least one preference about dietary restrictions, allergy information, and/or any other user preference.

3. The non-transitory computer program product of claim 1, further comprising:

receiving a user purchase history from a user history database;

analyzing the user purchase history and/or the user preference information, in order to identify a trend in the user purchase history and/or the user preference information, wherein the trend includes at least one trend about brand preference, dietary restriction preference, or any other trend;

generating at least one item recommendation for the user based on the analyzed user purchase history and/or the user preference information, and the identified trend; and transmitting the at least one item recommendation to the user computing device to be displayed on the graphical user interface;

wherein the generated route further includes the at least one item recommendation.

4. The non-transitory computer program product of claim 1, further comprising:

receiving a user purchase history from a user history database;

determining whether the at least one item included within the list and/or the recipe conflicts with the user preference information;

in response to determining that the at least one item is not in stock and/or that the at least one item conflicts with the user preference information, generating a second at least one substitution item for the at least one item that is not in stock and/or for the at least one item that conflicts with the user preference information, based on the user purchase history, the user preference information, and/or an item information; and transmitting the second at least one substitution item to the user computing device to be displayed on the graphical user interface;

wherein the generated route further includes the second at least one substitution item.

5. A computer system for intelligently managing a store inventory stock, the computer system comprising:

one or more computer processors, one or more computer-readable storage media, and program instructions stored on one or more of the computer-readable storage media for execution by at least one of the one or more processors, the program instructions comprising:

detecting, by a computer, a user computing device when the user computing device enters a store;

receiving a user preference information from a user preference database, wherein the received user preference information comprises dietary restrictions;

receiving a list and/or a recipe inputted into an application by a user, wherein the list and/or the recipe includes at least one item that the user plans to purchase;

identifying using sensors, the at least one item included within the list and/or the recipe that the user plans to purchase, wherein the sensors are registering movement of a plurality of items off a shelf in the store inventory stock and connected to the computer;

based on determining that the at least one item included within the list and/or the recipe conflicts with the dietary restrictions:

generating at least one substitution item for the at least one item included within the list and/or the recipe that conflicts with the dietary restrictions and for the at least one substitution item:

replacing the at least one item included within the list and/or the recipe that conflicts with the dietary restrictions from the received user preference information with the generated at least one substitution item when the at least one substitution item is in the store inventory stock;

generating a route through the store based on a store layout map, an item placement map, and the replaced at least one substitution item included within the list and/or the recipe, wherein the item placement map is updated based on data from the sensors; and transmitting the route to the user computing device to be displayed by a graphical user interface.

6. The computer system of claim 5, further comprising:

receiving a user purchase history from a user history database;

analyzing the user purchase history and/or the user preference information, in order to identify a trend in the user purchase history and/or the user preference information, wherein the trend includes at least one trend about brand preference, dietary restriction preference, or any other trend;

generating at least one item recommendation for the user based on the analyzed user purchase history and/or the user preference information, and the identified trend; and transmitting the at least one item recommendation to the user computing device to be displayed on the graphical user interface;
wherein the generated route further includes the at least one item recommendation.

7. The computer system of claim 5, further comprising:
receiving a user purchase history from a user history database;
determining whether the at least one item included within the list and/or the recipe conflicts with the user preference information;
in response to determining that the at least one item is not in stock and/or that the at least one item conflicts with the user preference information, generating a second at least one substitution item for the at least one item that is not in stock and/or for the at least one item that conflicts with the user preference information, based on the user purchase history, the user preference information, and/or an item information; and
transmitting the second at least one substitution item to the user computing device to be displayed on the graphical user interface;
wherein the generated route further includes the second at least one substitution item.

* * * * *